Figure 1:
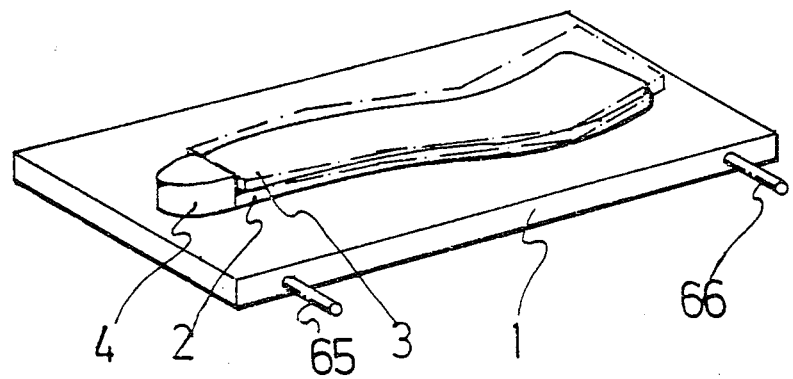

United States Patent [19]

De Muynck

[11] 4,260,001
[45] Apr. 7, 1981

[54] WOODWORKING MACHINES

[75] Inventor: Gabriël De Muynck, Ardooie, Belgium

[73] Assignee: Bekaert Engineering, Zwevegem, Belgium

[21] Appl. No.: 948,621

[22] Filed: Oct. 3, 1978

[30] Foreign Application Priority Data

Oct. 3, 1977 [BE] Belgium .................. 8414

[51] Int. Cl.³ .............................. B27G 5/06
[52] U.S. Cl. ................... 144/144 A; 29/561;
51/5 C; 144/3 R; 144/144 R; 144/326 R;
198/472
[58] Field of Search ............ 29/563, 564, 561;
198/472, 648; 144/1 R, 3 R, 144 R, 144 A,
144.5, 146, 145, 145 A, 323, 326 R, 242 R, 242
D, 245 R, 245 A, 249 R, 249 A; 51/215, 5 R, 5 C

[56] References Cited

U.S. PATENT DOCUMENTS

| 1,551,178 | 8/1925 | Strand | 144/144 R |
|---|---|---|---|
| 1,798,512 | 3/1931 | Young | 51/5 C |
| 2,631,621 | 3/1953 | Otte | 144/144 R |
| 2,851,071 | 9/1958 | Schils | 144/144 R |
| 3,165,976 | 1/1965 | Haspel | 144/144 A X |
| 3,313,393 | 4/1967 | Solski et al. | 198/472 |
| 3,814,153 | 6/1974 | Schmidt | 144/3 R |
| 3,913,272 | 10/1975 | Johnson et al. | 51/5 C |
| 3,942,566 | 3/1976 | Schmidt | 144/144 R |
| 4,677,449 | 3/1978 | Helmes | 144/144 R |

FOREIGN PATENT DOCUMENTS

| 1277422 | 10/1961 | France. | |
| 1435166 | 3/1966 | France. | |
| 2261105 | 2/1974 | France | 144/144 R |
| 7607226 | 6/1976 | Netherlands. | |

Primary Examiner—W. Donald Bray
Attorney, Agent, or Firm—Shlesinger, Arkwright, Garvey & Dinsmore

[57] ABSTRACT

An apparatus and method for shaping and finishing at least a part of the periphery of a planar workpiece of wood or similar material in which the workpiece and a template are mounted on a carrier block which is drawn along a machine bed where the workpiece is shaped and finished in accordance with the template by a plurality of pivotally mounted material removing shaping tools and finishing tools, the workpiece being maintained in position on the template by a plurality of overlying rollers during its passage past the tools, and, after shaping and finishing, the workpiece being returned by a second conveyor to the inlet side of the apparatus.

21 Claims, 6 Drawing Figures

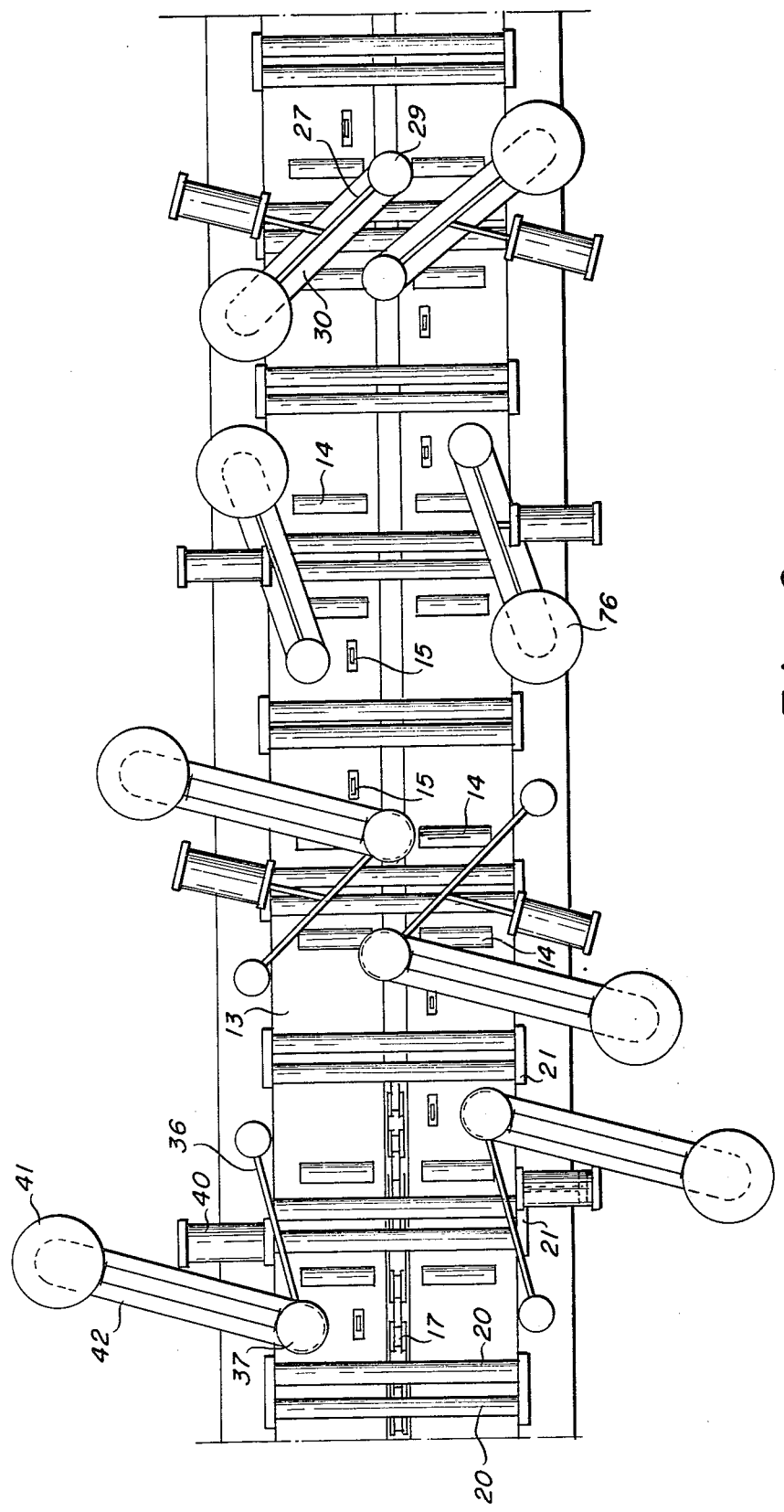

WOODWORKING MACHINES

This invention relates to the shaping and finishing by machine of planar workpieces of wood and similar materials, such as plastics, fibreboard and chipboard.

Known machines for this purpose have a number of disadvantages which render the production of components for the furniture industry very expensive; for instance:

(a) The working tools move only in one plane perpendicular to the feed direction of the workpiece so that the leading and trailing edges of the workpiece have to be finished separately;

(b) A workpiece is driven by means of carrier hooks on a block chain; due to the movability of the chain links, vibrations are generated by the impact resistance against the cutting tools which leads to damage to the workpiece;

(c) The guide support, template and workpiece must first of all be clamped to each other in a frame or on a trolley which must be dismantled again afterwards;

(d) The absence of a return conveyor necessitates placing operating personnel at both ends of the machine; the next operation can only be started when the preceding cycle is completely finished;

(e) The use of a machine bed with two block-chains results in the irregular finishing of workpieces because these chains deform unequally under the influence of strain and lateral forces.

According to the invention there is provided a method of shaping and finishing at least a part of the periphery of a planar workpiece of wood or similar material including the steps of freely mounting the workpiece on a template which is in turn mounted on a carrier block having one or more catches on its underside and engaging the at least one catch and preferably two catches with a chain serving to draw the carrier block along a machine bed.

The method preferably includes maintaining the workpiece on the template by means of a plurality of overlying rollers successively serving to press the workpiece against the template.

A particularly preferred method includes performing a template copying operation on the workpiece between successive rollers in which material-removing tools follow a template profile while swivelling about a fixed shaft perpendicular to the plane of movement of the workpiece.

Another aspect of the invention provides a machine for shaping and finishing at least a part of the periphery of a planar workpiece of wood or similar material which includes a machine bed provided with support rollers, a longitudinal slot in said machine bed in or beneath which is disposed a chain conveyor, a carrier block for a workpiece provided on its underside with one or more catches adapted for engagement with said chain whereby the carrier block may be drawn through the machine over said rollers, and a frame disposed adjacent the machine bed for mounting one or more material-removing tools for operative impingement on said workpiece.

Figure 2:
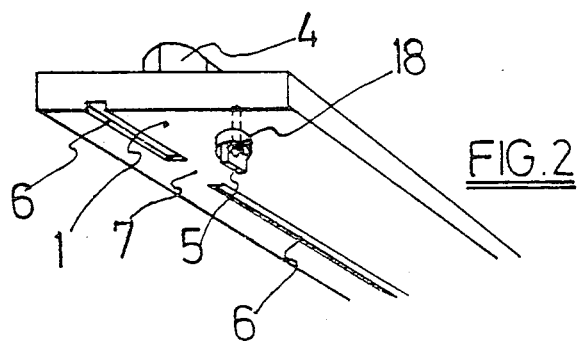
Figure 3:
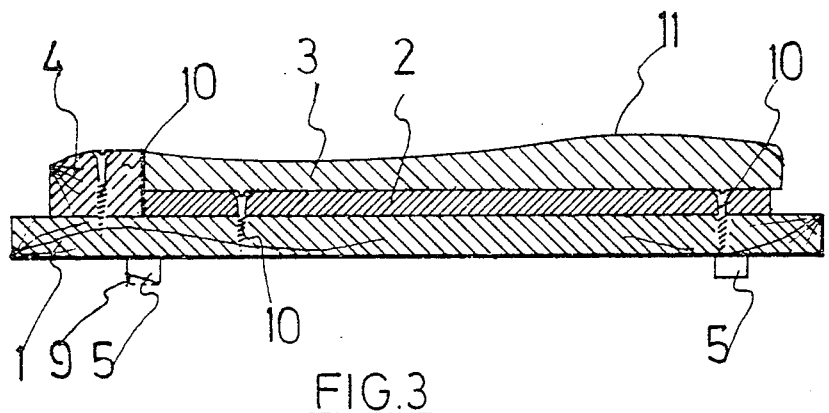
Figure 4:
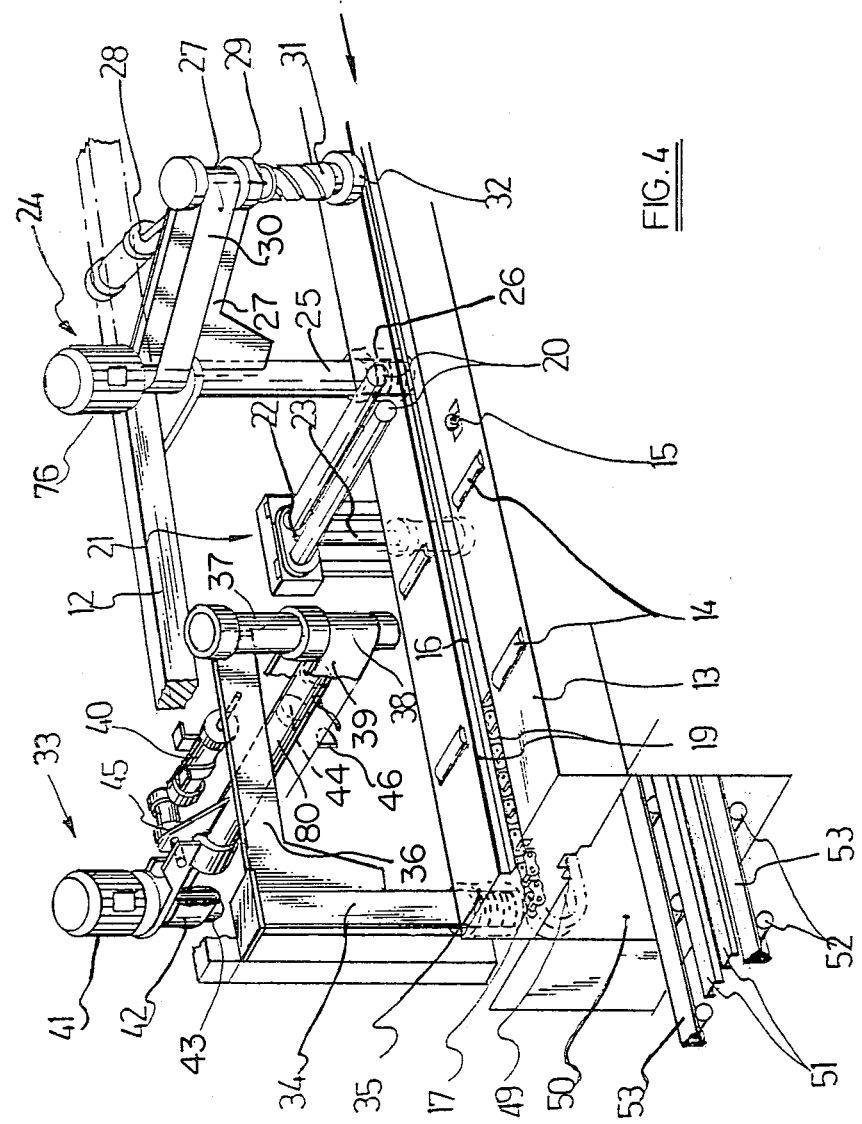
Figure 5:
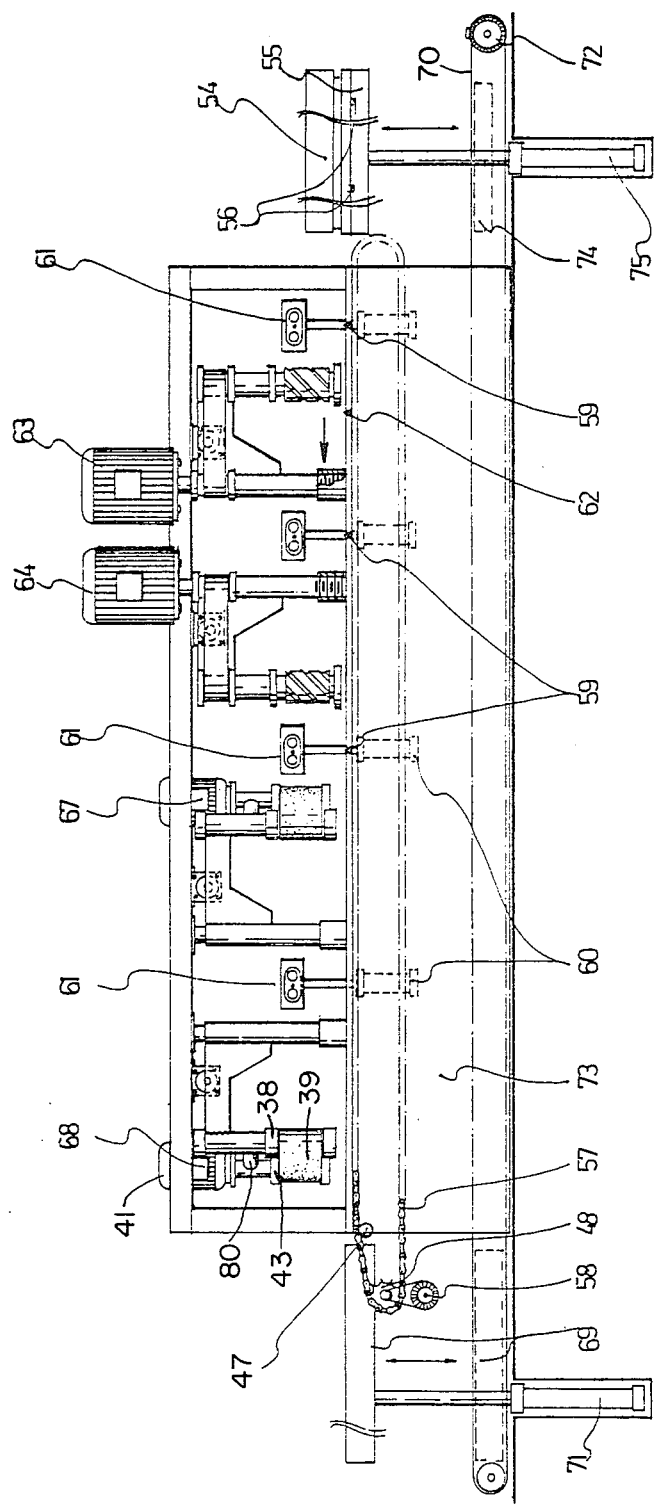

In order that the invention may be readily understood an embodiment thereof will now be described by way of example with reference to the accompanying drawings in which:

FIG. 1 is a perspective view of a carrier block;
FIG. 2 is a view of the underside of the carrier block;
FIG. 3 is a sectional view of the carrier block;
FIG. 4 is a perspective view of the structure of a machine according to the invention;
FIG. 5 is a schematic view of a set up of the different operations;
FIG. 6 is a schematic view of a machine set up.

Different reference numerals have been used to refer to similar structural elements in the different embodiments of the invention shown in the various figures to clarify which machine configuration is being referred to.

In the machining operation, a workpiece mounted on a carrier block as shown in FIG. 1 is passed through the machine.

The carrier block or guide support 1 is made of a strong material, such as plywood, aluminum or similar material and is provided with a template 2 which will be copied in the machine.

The workpiece 3 is placed on this template so that both template and workpiece abut a nose piece 4 preferably made of wood to avoid damage to the cutting tools. With some precautions this nose piece 4 may be omitted to be able to machine the workpiece around its complete periphery. For retaining and positioning the workpiece, template and carrier block, the carrier block is provided on the underside and on the centre axis with at least one and preferably two catches 5 which may engage the slat and chain belt, see FIG. 2. If one of these catches is omitted, the carrier block itself may serve as guide between the ridges of the machine bed. FIG. 2 shows a slot 6 at the underside of the carrier block 1, which includes certain interruptions 7 which act as an actuator for the automatic speed adjustment of the slat and chain belt which will be further described.

The sectional view of FIG. 3 shows that these catches 5 have an oblique profile 9 to activate certain contacts selectively. At the upperside of the carrier block, the nose piece 4 and template 2 are fixedly attached by means of bolts 10. The workpiece 3 lies freely thereon and may even have a slight curvature on its upward facing surface 11. In some cases the template 2 may also lie loosely on the carrier block.

The machine is composed of a frame 12 to which are fixedly attached different components. The machine bed 13 comprises a number of freely spinning bearing rollers 14 forming a conveyor surface which supports the carrier block for movement in the direction indicated by the arrow. Switches 15 (only one of which is shown) are activated by the carrier block when the latter passes over them. A central slot 16 in the machine bed guides a slat and chain belt 17 whose apertures are adapted to receive the catches 5 of the carrier block with as little play as possible. The tolerances between the chain belt 17 and the slot 16 are also kept minimal since they determine the accuracy of the position of the carrier block. The size of the slat and chain belt will also determine the distance required between the catches 5. Preferably this chain is a single core slat and chain belt, also called block chain, but it may also be a double core or triple core chain, i.e. with three or four parallel links, depending on the forces to be withstood. To maintain an accurate uniform rectilinear movement during the running of the chain usually a chain with double pitch is used on an ordinary cog wheel. The guidance of the carrier block by the chain in the slot is improved by running the chain in a counter-sunk position and positioning about the engaged catch 5 a fitting ring 18 which is held between the slot ridges 19 and takes up the lateral forces with minimal shifting of the carrier block.

Continuously located over the length of the machine bed are working presses which consist of pairs of pressure rollers 20, preferably coated with rubber, which are freely rotatable and are held in a tiltable yoke 21 of which the hinge point 22 is located opposite a connecting rod 23 driven by a pressure cylinder. The position of the roller yoke 21 is usable to control the pressing force of the connecting rods 23 by a judicious choice of the hinge point position 22. The rollers which are preferably in the form of cylinders coated with synthetic material may also comprise a spindle on which a series of rings alternating in outer diameter from small to large to small and back to large again, etc., are slid.

A shaping attachment 24 is mounted at a station beside the machine bed and attached to the machine frame 12 by means of a vertical supporting shaft 25 which acts as a stand. Preferably this supporting shaft 25 is mounted on a connecting bushing 26 which is adapted to make the entire shaping attachment adjustable for height. The entire shaping attachment 24 is mounted rotatably around the shaft 25 by means of the swivelling arm 27. The turning movement of this arm can be controlled by a pressure cylinder 28 which urges the arm away from the frame 12.

The shaping attachment 24 mainly comprises a driving motor 76 for the shaper and the drive shaft 29 which is mounted on the swivelling arm 27. The motor 76 is located above the shaft 25 and drives the shaft of the shaper 29 by for example a belt transmission 30. The cutting tool, specifically the shaper 31, has the form and dimensions required for the piece to be machined. The working height is adjusted to that of a workpiece by means of the screw thread on the connecting bushing 26. Under the shaper 31 and positioned on the shaft 29 a tracer 32 is located which is preferably composed of a contact rolling which scans the contour line of the model or template 2 on the carrier block thus providing that the same profile is cut out of the workpiece by the shaper 31.

For easy verification of the adjustment and for arbitrary exchangeability, the template and finished piece have the same dimensions but this need not always be so. Owing to a difference in position and dimensions, the profile of the template could possibly be different from that of the finished workpiece.

In conjunction with an attachment for shaping certain profiles, an attachment for sanding the surface of a workpiece can be provided. For that purpose, a loop-shaped sanding belt may preferably be used. By way of example, the attachment 33 of FIG. 4 will be described.

The sanding attachment 33 is attached to the machine frame 12 by means of a supporting shaft 34 having a connecting bushing 35 which is adjustable for height by means of a screw thread. A swivelling arm 36 supports a floating shaft 37. A sanding bobbin 38 on shaft 37 with a preferably flexible surface such as rubber, presses the sanding belt 39 against the workpiece. This sanding belt is for example composed of an endless loop of paper or cloth, provided at the outer side with a layer of abrasive material, such as silicon carbide or the like. A contact roller as used in the shaper attachment is not always necessary here. The sanding belt is held against the workpiece with steady or adjustable pressure and follows automatically the workpiece profile. The contact pressure is applied by pressure cylinder 40 which makes the swivelling arm 36 rotate away from the frame 12 pivoting on the supporting shaft 34. The sanding belt 39 is driven by the motor 41 by means of the shaft 42 and the driving roller 43. A guide and support 80 adjustable in length is provided for the motor 41, shaft 42 and driving roller 43. The guide and support 80 is in turn connected to and support by the floating shaft 37 whereby the motor 41, shaft 42 and driving roller 43 are pivotable about the support shaft 34 by means of the swivelling arm 36 to which they are connected through the floating shaft 37. The guide and support 80 includes a pressure cylinder 44 to adjust the distance between the driving section and the grinding section and thereby to regulate the tension on the sanding belt 39.

Driving roller 43 is pivotable relative to bobbin 38 by means of a pressure cylinder 45. In this regard, as seen in FIG. 4, the motor 41 and associated elements are pivotally supported about one end of the guide and support 80. To obtain a more uniform workpiece surface the sanding belt 39 is oscillated vertically, i.e. caused to travel upward and downward on the sanding bobbin 38 and driving roller 43 while rotating about them, by tilting the driving roller 43 relative to the sanding bobbin 38 by means of the pressure cylinder 45 first in one direction and then in the other direction. The direction of tilt and consequently the direction of the vertical movement of the sanding belt 39 is reversed via a contact 46 which controls the pressure cylinder 45. This contact 46 is for example a hard metal plate with an oblique upper side which is touched by the underside of the sanding belt 39 as the sanding belt 39 descends during each vertical oscillation. This sliding contact 46 activates a pneumatic valve which sends a signal to the pressure cylinder 45 causing the pressure cylinder 45 to reverse the direction of the tilt of the driving roller 43 relative to the sanding bobbin 38.

To benefit from all advantages of the invention and to reach a finishing of at least three side planes of the workpiece and, by observing certain precautions, the whole periphery of the workpiece with a simple feed through of the carrier block, it is important that the centres of shafts 29 and 37 of the tools in fully swung-out position reach or exceed the central axis of the chain 17 to thereby machine the backside or third portion of the workpiece as viewed in FIG. 1.

An equal number of shaping and sanding attachments, generally called material-removal attachments, are provided in conventional design on both sides of the machine bed. At its driven end, the chain is first received by a plane guiding wheel 47, slightly bent and engaged by a sprocket 48, as illustrated in FIG. 5. In this process the catches 5 of the guiding support 1 are gradually released from the chain. The chain is returned to the front side of the machine through an underlying slot 49.

Not only for saving space but also for reasons of optimalization, a return bed 50 is provided in which a conveyor system is mounted which is composed of a supporting structure 51, a series of supporting rollers 52 and, for example, a pair of trapezoidal supporting belts 53.

Plainly the shaper arrangement 24 and the sanding arrangement 33 may be attached to the frame 12 by means of a stand mounted adjacent the machine bed. Yet for some applications, it may be advantageous to fix these arrangements to a stand at the upper part of the frame in a suspended configuration. It may be considered that the stand must not be mounted beside the machine bed, but may also be located over the feed bed so that another dimensioning may be applied, for example some treatments of the upper plane of the workpiece. In this case the swivelling arm 36 may also be bent or double-hinged instead of rectilinear.

FIG. 5 gives a schematic view of the structure of a fully equipped machine. The carrier block 54 lies ready on the feed table 55 and is pushed by a simple hand movement into the machine. The catches 56 of the carrier block 1 engage into the slat and chain belt 57 which is driven by motor 58. In the bottom of the feedbed switches 59 are provided, which, when contact is made, activate the pressure cylinders 60 which each time press a set of pressure rollers on the carrier block 54 to hold the workpiece in place by friction only.

Preferably a number of sets of pressure rollers 61 are provided so that during the cutting operation the workpiece is held by at least two such sets and a finish on each workpiece of high dimensional accuracy is obtained. Such an arrangement is beneficial in taking up a greater amount of the cutting force of the tools. This arrangement is also advantageous in the manufacture of oblong workpieces. The material-removing operations takes place between the sets of pressure rollers.

An additional contact 62 in the bottom of the machine bed will be activated by the carrier block 1 to have a first shaping attachment 63 swing aside so that the contact roller strikes the nose piece of the carrier block 1 and connecting template and so that the shaper, following this movement, traces and shapes the workpiece. When, at the end of the template, the contact roller moves over the machine bed axis line, a supplementary contact may return the tool to its starting position. In this manner the successive process stations may finish the workpiece automatically while the carrier block keeps moving forward.

FIG. 5 shows successively for example the attachment 63 for rough shaping and next the attachment 64 for fine shaping. It can be seen that the swivelling direction of shaper attachment 64 is opposite to that of shaper attachment 63. The rotating direction of the shaper can also be adapted to the fibre direction of the wood. In those cases where also the front side of the workpiece is shaped, there will be no nose piece on the carrier block. In the starting position the shaper attachment will be swung out with the shaping tool in the centre of the machine bed. The contact roller strikes directly the front side of the template and will trace it at one side. In such cases the shape of the template must be such that the contact roller cannot hook behind a corner of the template and block the machine. A similar shaper attachment mounted at the other side of the machine bed will in a similar manner follow the other side of the template.

The instruction to a shaper attachment in order to engage in swung-out position a carrier block, can be transmitted by the carrier block via incorporated catches such as 65 and 66 in FIG. 1. A difference in catch length may be used to select through adapted contact switches the desired position of the shaper arrangement.

In the same way a sanding attachment 67, as described in FIG. 4 for rough polishing and a similar sanding attachment 68 for fine polishing of the workpiece can be provided.

It is evident that the setup described so far mainly relates to one side of the machine and that the other side of the machine bed is equipped with similar attachments. It is also essential that in this setup the oppositely situated attachments are not located at the same height for reasons of geometric overcutting of the tools in swung-out position. In fact the successive material-removing attachments are alternated.

At the end of the machine the carrier block is pushed onto a receiving elevator table 69 by the chain 57. This table serves as an elevator and will, by means of an automatic connection, bring the carrier block down and will stop in countersunk position between the upper and lower levels of the conveyor belts 70 so as to position the carrier block at the upper level of the conveyor. These conveyor belts are preferably trapezoidal supporting belts whether or not toothed. A block chain however is a usable alternative.

The movement of the elevator table 69 can be generated by a pressure cylinder 71 which is mounted in the foundation. The carrier block is received by conveyor belts 70 which are driven by motor 72. As soon as this carrier block has left the elevator 69 the latter rises immediately to the starting position to receive the next carrier block.

In the meantime the preceding carrier block is moved by the belts 70 in the return bed 73 where it is slid on to the countersunk elevator table 74 which is moved by the pressure cylinder 75. With that movement the table 55 brings the carrier block to its starting position while the elevator forms at the same time the supply table 55.

The machine operator can now remove the workpiece from the template and simply put a new workpiece on the reusable template to restart the cycle, whereafter the table 55 moves downward again to obtain the next carrier block. Indeed, in the meantime a number of other carrier blocks may already be sent through the machine. Preferably the successive carrier blocks are detained in the return bed 73 when there is a slow down in the exchange of workpieces. This return bed then serves as a supply magazine.

Thus it is clear that a workpiece in the finishing cycle does not constitute any obstacle for further loading the machine. The exchange of workpieces takes place very rapidly as the workpieces lie loosely on the template. If there is no nose piece as the nose piece 4 of FIG. 1 then the upper surface of the template can be made rougher by gluing sandpaper on it. The greater friction under the pressure of the pressure rollers 61 then is useful to ensure an unchangeable position of the workpiece on the template.

The aforegoing description is only an example of an embodiment of the machine. A great number of variants are possible.

In the description the elements serving for material treatment and transportation were preferably provided with electric drives and those for positioning and clamping with pressure cylinders. In this respect pressurized air is the most advantageous driving force.

It is evident that the elevator tables 69 and 74 of FIG. 5 may be operated by hydraulic means as well as with mechanical linkage elevators, whereas the swivelling of the shaper attachments can be achieved by means of electric servo motors. Other components can be operated by a pressure cylinder in combination with a spring.

The contacts between fixed and moving parts were mainly represented as catch switches which may be electric as well as electro-pneumatic. It is also contemplated that this information can be transmitted by magnetic signals received in the guiding support, or by pneumatic signals induced through holes in the guiding support. These means may be applied in combination or/and with time relays so that a judicious programming of a cycle becomes possible.

An embodiment of the shaper arrangement is shown whereby the contact roller and shaper are mounted on the same vertical shaft so that a geometrically uniform copy is made.

For example, a horizontal slot may be provided in the template in which with one particular shaper attachment runs a narrow contact roller, so that a corresponding portion is removed from the workpiece by a shaper with specific shape. Due to the adjustability for height of the attachment, contact roller, and shaper, the slot in the template need not necessarily be in the same place as on the workpiece. The template may be subdivided accordingly into several levels which control separate attachments.

It is neither excluded that a contact roller having a vertical shaft runs over the template profile, while a material removing tool fixedly attached to it and rotating around a horizontal shaft achieves the shaping of the workpiece. The shaper can also be a saw plate or similar tool and for example provide a tooth and slot profile in some parts of the workpiece. It is also possible to round the upper surface of the workpiece by means of such methods.

With respect to the method described there are possible alternatives such as omitting or adding certain process attachments. The return channel can be above the machine. A supplementary attachment can be provided to prevent the conveyor belts from removing the carrier blocks from the elevator 69 of FIG. 5 or from placing them on the feeding table 74 of FIG. 5. According to the nature of the accomplished workpieces a program-selective carrier block removal can be provided, whereby for example a portion is moved to another part of the workplace and still another portion would be returned to the starting position through the return bed. If one copy of a certain workpiece is available it is also possible to use the shaper arrangements for example in reverse order to exchange contact roller and shaper so that, by means of an existing copy, a usable template can be produced. This is useful in cases whereby template and workpiece cannot have the same geometric shape.

I claim:

1. An apparatus for shaping and finishing at least a part of each of the peripheries of planar workpieces of wood or similar material, comprising:
   carrier blocks each having a template positioned thereon, each said template being adapted to have a planar workpiece carried on the top thereof unattached to said template;
   an apparatus bed for passage of said carrier blocks through said apparatus, said bed having an input end and an output end and means extending from said input end to said output end for conveying said carrier blocks along said bed from said input end to said output end with a uniform rectilinear movement, said conveying means being positioned centrally on said bed and each said carrier block including means for engaging said conveying means;
   at least one pivotally mounted shaping means positioned on each side of said bed for tracing each said template and shaping at least a part of the periphery of each workpiece in accordance with the pattern of its template, each said shaping means pivoting from a fixed position with respect to said bed and including means for pivoting said shaping means so as to engage a workpiece as the workpiece passes along said bed;
   at least one pivotally mounted sanding means positioned on each side of said bed for sanding and thereby finishing at least a part of the periphery of each workpiece, each said sanding means pivoting from a fixed position with respect to said bed and including means for pivoting said sanding means so as to engage a workpiece as the workpiece passes along said bed;
   a plurality of pressing means overlying said bed and fixed in longitudinal position with respect to said bed for successively contacting each workpiece from above as the workpiece passes along said bed to hold the workpiece by friction alone against its template in a fixed position with respect to said template; and,
   sensing means in said bed for automatically activating each of said shaping means, said sanding means, and said plurality of pressing means in response to the passage of each said carrier block along said bed.

2. The apparatus of claim 1 and including conveying means positioned underneath said apparatus bed for returning said carrier blocks with said templates and the workpieces mounted thereon from said output end to said input end of said apparatus bed.

3. The apparatus of claim 1 in which said apparatus bed has a central longitudinal slot and said conveying means comprises a single core slat and chain belt disposed in said longitudinal slot.

4. The apparatus of claim 1 wherein said apparatus bed has a plurality of support rollers for said carrier blocks.

5. The apparatus of claim 1 wherein each said pressing means includes freely rotating rollers for contacting the workpieces.

6. The apparatus of claim 1 wherein each said pressing means comprises a pair of freely rotating rollers mounted in a tiltable yoke.

7. The apparatus of claim 2 and including means at said output end of said apparatus bed for automatically lowering said carrier blocks from said apparatus bed to said return conveying means and means at said input end of said apparatus bed for automatically raising said carrier blocks from said return conveying means to said apparatus bed.

8. The apparatus of claim 1 wherein said means for pivoting said shaping means and said means for pivoting said sanding means each includes means for pivoting each of said shaping means and said sanding means to a point beyond the central longitudinal axis of said apparatus bed.

9. The apparatus of claim 1 and including mounting means for each said shaping means and each said sanding means, said mounting means including means for adjusting the heights of said shaping means and said sanding means relative to said apparatus bed.

10. The apparatus of claim 9 wherein each said mounting means includes a support shaft, said height adjusting means comprising a connecting screw-threaded bushing upon which said support shaft is mounted.

11. The apparatus of claim 1 and including a plurality of said shaping means and a plurality of said sanding means, said apparatus also including mounting means for each of said shaping means permitting said shaping means to be pivoted in opposite directions and mounting means for each of said sanding means permitting said sanding means to be pivoted in opposite directions.

12. A method for shaping and finishing at least a part of each of the peripheries of planar workpieces of wood or similar material, comprising the steps of:
    placing planar workpieces each on a template mounted on a carrier block without attaching the workpieces to said templates;
    engaging said carrier blocks on the conveying means of an apparatus bed having an input end and an output end, said conveying means extending from said input end to said output end and being positioned centrally on said apparatus bed;
    conveying the carrier blocks along said apparatus bed from said input end to said output end with a uniform rectilinear movement;
    successively contacting each workpiece from above as the workpiece passes along said bed with a plurality of pressing means overlying said bed and fixed in longitudinal position with respect to said bed to hold each workpiece by friction alone against its template in a fixed position with respect to said template;
    tracing each said template and shaping at least a part of the periphery of each workpiece in accordance with the pattern of its template with at least one pivotally mounted shaping means positioned on each side of said bed, each said shaping means pivoting from a fixed position with respect to said bed and including means for pivoting said shaping means so as to engage each workpiece as the workpiece passes along said bed; and,
    sanding and thereby finishing at least a part of the periphery of each workpiece with at least one pivotally mounted sanding means positioned on each side of said bed, each said sanding means pivoting from a fixed position with respect to said bed and including means for pivoting said sanding means so as to engage each workpiece as the workpiece passes along said bed.

13. The method of claim 12 and including returning said carrier blocks with said templates and the workpieces mounted thereon from said output end to said input end of said apparatus bed using a return conveying means positioned underneath said apparatus bed.

14. The method of claim 12 wherein said apparatus bed has a central longitudinal slot and said conveying means comprises a chain belt disposed in said slot and each said carrier block includes at least one catch on the underside thereof for engaging said chain belt.

15. The method of claim 12 wherein said apparatus bed has a plurality of support rollers for said carrier blocks.

16. The method of claim 12 wherein each said pressing means comprises a pair of freely rotating rollers.

17. The method of claim 16 wherein each said pair of freely rotating rollers is mounted in a tiltable yoke.

18. The method of claim 12 and including the steps of removing each finished workpiece from its template and carrier block after each said carrier block is returned to said input end of said apparatus bed and placing a new workpiece on said template and said carrier block.

19. The method of claim 12 and including the step of adjusting each of said shaping means and each of said sanding means for height, each of said shaping means and each of said sanding means having a support shaft about which it pivots mounted on a connecting bushing and said height adjusting is by means of a screw thread on said connecting bushing.

20. The method of claim 12 wherein the part of the periphery of each workpiece shaped and sanded includes at least three sides of the workpiece.

21. The method of claim 12 and including activating each of said shaping means, said sanding means and said plurality of pressing means in response to the passage of each said carrier block along said apparatus bed using sensing means in said apparatus bed.

* * * * *